(12) United States Patent
Sakata et al.

(10) Patent No.: US 8,085,525 B2
(45) Date of Patent: Dec. 27, 2011

(54) ELECTRIC DOUBLE LAYER CAPACITOR INCLUDING CURRENT COLLECTOR HAVING A PLURALITY OF APERTURES THEREIN

(75) Inventors: Motohiro Sakata, Osaka (JP); Hideki Shimamoto, Kyoto (JP); Keiichi Kondou, Hyogo (JP)

(73) Assignee: Panasonic Corporation, Osaka (JP)

( * ) Notice: Subject to any disclaimer, the term of this patent is extended or adjusted under 35 U.S.C. 154(b) by 224 days.

(21) Appl. No.: 12/066,435

(22) PCT Filed: Nov. 13, 2006

(86) PCT No.: PCT/JP2006/322526
§ 371 (c)(1),
(2), (4) Date: Mar. 11, 2008

(87) PCT Pub. No.: WO2007/055348
PCT Pub. Date: May 18, 2007

(65) Prior Publication Data
US 2009/0262485 A1 Oct. 22, 2009

(30) Foreign Application Priority Data

Nov. 14, 2005 (JP) ................................. 2005-328386

(51) Int. Cl.
*H01G 9/00* (2006.01)
(52) U.S. Cl. ...................................................... 361/502
(58) Field of Classification Search .................... 361/502
See application file for complete search history.

(56) References Cited

U.S. PATENT DOCUMENTS

| 1,752,963 | A | * | 4/1930 | Pettinelli ....................... 429/239 |
| 4,327,400 | A | | 4/1982 | Muranaka et al. |
| 5,543,250 | A | | 8/1996 | Yanagihara et al. |
| 5,601,953 | A | * | 2/1997 | Schenk .......................... 429/241 |
| 5,849,430 | A | * | 12/1998 | Lee ................................... 429/94 |
| 5,949,637 | A | * | 9/1999 | Iwaida et al. .................. 361/502 |
| 6,096,455 | A | * | 8/2000 | Satake et al. ................... 429/241 |
| 6,447,957 | B1 | * | 9/2002 | Sakamoto et al. ............. 429/242 |
| 6,461,769 | B1 | * | 10/2002 | Ando et al. ............... 429/231.95 |
| 6,885,545 | B2 | * | 4/2005 | Michel et al. ................. 361/502 |
| 6,893,777 | B2 | * | 5/2005 | Probst ............................ 429/233 |
| 6,994,902 | B2 | | 2/2006 | Fukunaga et al. |

(Continued)

FOREIGN PATENT DOCUMENTS

| JP | 54-12620 | 5/1979 |
| JP | 04-162510 | 6/1992 |
| JP | 07-130370 | 5/1995 |

(Continued)

*Primary Examiner* — Eric Thomas
*Assistant Examiner* — David M Sinclair
(74) *Attorney, Agent, or Firm* — McDermott Will & Emery LLP

(57) ABSTRACT

An electric double layer capacitor includes a case, an electrolyte solution accommodated in the case, and an electrode foil immersed in the electrolyte solution. The electrode foil includes a collector and an electrode layer covering the collector. The collector has a first surface and a second surface opposite to the first surface. The collector has apertures provided therein. The apertures communicate with the first surface and the second surface of the collector. The collector includes a projection provided at an edge of at least one aperture out of the apertures. The projection projects from the first surface of the collector and penetrates the electrode layer. The electric double layer capacitor provides a large contact area and a large joining strength between the collector and the electrode layer, and allows the collector to have a small thickness, hence having a large output density and a large energy density.

8 Claims, 8 Drawing Sheets

U.S. PATENT DOCUMENTS

| | | | |
|---|---|---|---|
| 7,000,297 B2 * | 2/2006 | Frustaci et al. | 29/2 |
| 7,006,346 B2 * | 2/2006 | Volfkovich et al. | 361/502 |
| 7,191,502 B1 * | 3/2007 | Ashizawa et al. | 29/2 |
| 2004/0115536 A1 * | 6/2004 | Blankenborg et al. | 429/245 |
| 2004/0258992 A1 * | 12/2004 | Park | 429/218.2 |
| 2005/0207096 A1 | 9/2005 | Hinoki et al. | |
| 2007/0002523 A1 * | 1/2007 | Ando et al. | 361/503 |

FOREIGN PATENT DOCUMENTS

| | | |
|---|---|---|
| JP | 09-134726 | 5/1997 |
| JP | 09-134726 A | 5/1997 |
| JP | 11-191418 | 7/1999 |
| JP | 2000-124081 | 4/2000 |
| JP | 2005-191423 | 7/2005 |
| WO | WO 2004097867 A2 * | 11/2004 |

* cited by examiner

Fig. 5

| | Projecting Direction of Projection | Collector | | Diameter of Aperture (μm) | Ratio R(%) | Shape of Aperture | Primer Layer | Height of Projection (μm) | Flexibility (mmφ) | Internal Resistance (mΩ) |
|---|---|---|---|---|---|---|---|---|---|---|
| | | Material | Thickness (μm) | | | | | | | |
| Comparative Example | - | Aluminum | 22 | - | 0 | - | N/A | 0 | 5.0 | 100 |
| Example 1 | Single Surface | Aluminum | 22 | 100 | 60 | Quadrilateral | N/A | 50 | 4.5 | 70.8 |
| Example 2 | Both Surfaces | Aluminum | 22 | 100 | 60 | Quadrilateral | N/A | 50 | 3.5 | 47.2 |
| Example 3 | Both Surfaces | Aluminum | 15 | 100 | 60 | Hexagon | N/A | 50 | 3.0 | 45.8 |
| Example 4 | Both Surfaces | Aluminum | 22 | 100 | 60 | Quadrilateral | Yes | 50 | 2.5 | 43.3 |
| Example 5 | Both Surfaces | Aluminum | 15 | 100 | 60 | Hexagon | Yes | 50 | 2.0 | 41.8 |
| Example 6 | Single Surface | Aluminum | 15 | 5 | 60 | Irregular Polygon | N/A | ≈0 | 2.0 | 41.6 |

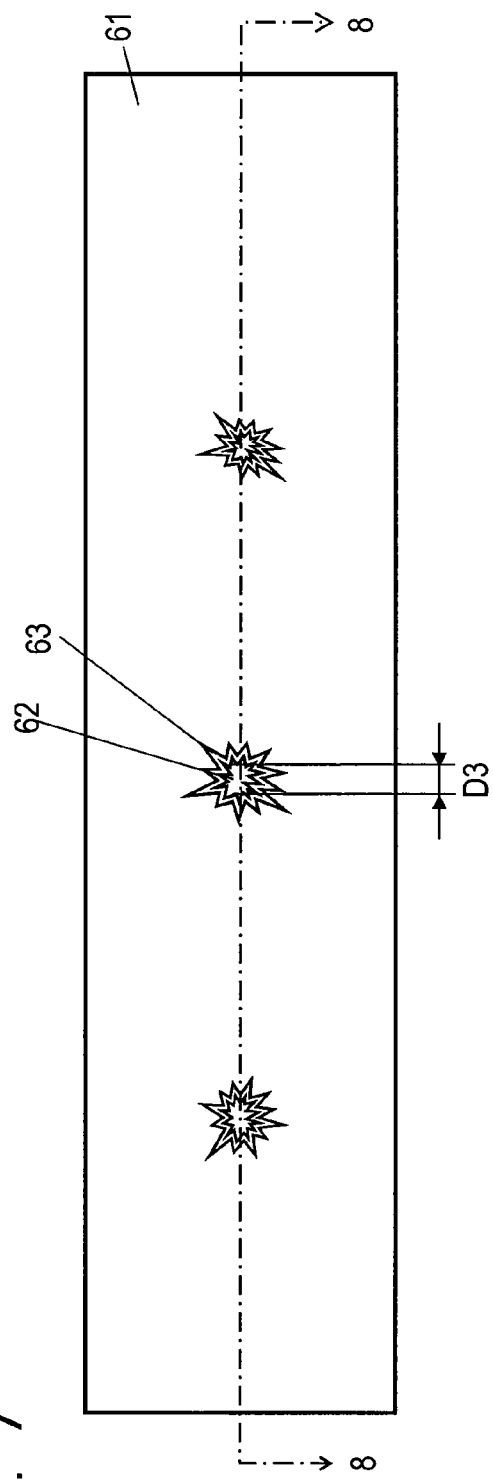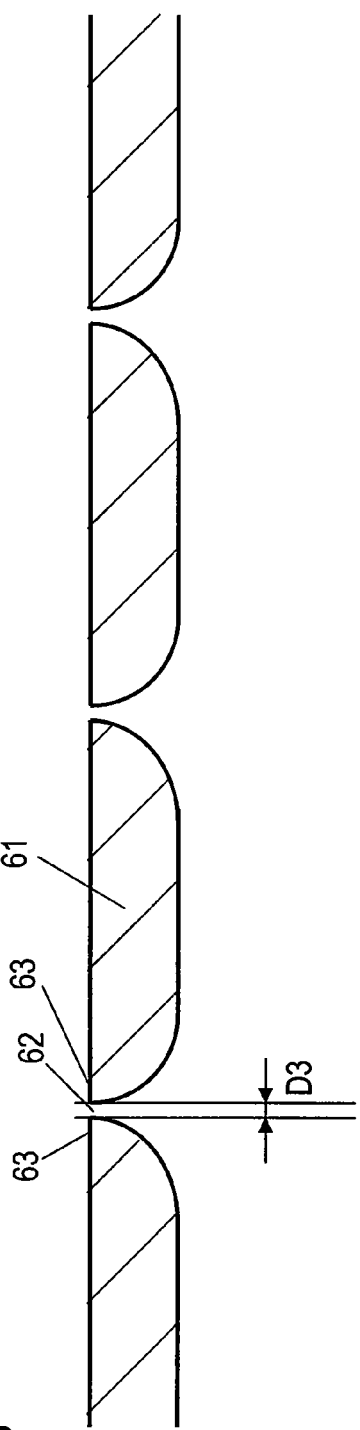

US 8,085,525 B2

ELECTRIC DOUBLE LAYER CAPACITOR INCLUDING CURRENT COLLECTOR HAVING A PLURALITY OF APERTURES THEREIN

RELATED APPLICATIONS

This application is the U.S. National Phase under 35 U.S.C. §371 of International Application No. PCT/JP2006/322526, filed on Nov. 13, 2006, which in turn claims the benefit of Japanese Application No. 2005-328386, filed on Nov. 14, 2005, the disclosures of which Applications are incorporated by reference herein.

TECHNICAL FIELD

The present invention relates to an electric double layer capacitor to be used in various types of electronic apparatuses.

BACKGROUND ART

An electric double layer capacitor includes a capacitor element which has a pair of polarizable electrodes and a separator provided between the polarizable electrodes. The capacitor element is accommodated together with an electrolyte solution and sealed in a case. Each of the polarizable electrodes includes a collector. The electric double layer capacitor has higher output density than secondary batteries and can output a large current instantly, hence being used as a power assisting unit in electric vehicles and uninterruptible power sources. Electric double layer capacitors are demanded to have a large output density and an energy density, have reliability for continuously applying a voltage, and have durability to repetitive discharging and recharging cycles. Electric double layer capacitors particularly used for vehicles are demanded to have large output density and a large energy density.

The electric double layer capacitors store and release electric charges by electrolytic ions attached to and removed from electrodes, and hence, have a larger output density and better low-temperature characteristics than batteries with chemical reaction. The output density depends largely on an internal resistance and a voltage in the electric double layer capacitor. In order to increase the output density, the internal resistance is reduced. The internal resistance can be reduced by increasing the contact area between the electrode and the collector. In order to reduce the decreasing of the internal resistance with time, the joining strength between the electrode and the collector is necessary. In order to producing the large energy density, the thickness of the collector is decreased to allow the electrode to have the occupying rate of the electrode in a cell. In order to have a small thickness, the collector has a physical strength.

Patent document 1 discloses a collector made of an aluminum mesh and a collector made of an aluminum foil having roughened surfaces. Patent document 2 discloses a collector made of an aluminum expanded metal. Even these collectors do not provide the large contact area, the joining strength, or the small thickness of the collector enough for a particular application, such as vehicles. The collector made of the expanded metal which merely has apertures therein may increase its joining strength by widening the apertures to allow the two electrodes located on respective surfaces of the collector to be jointed. However, the widening of the apertures reduces the physical strength of the collector, accordingly preventing the collector from having a small thickness. Further, the widening of the apertures reduces a contacting area between the collector and the electrodes, accordingly increasing the internal resistance of the electric double layer capacitor.

Patent Document 1: Japanese Patent Laid-Open Publication No. 4-162510.

Patent Document 2: U.S. Pat. No. 4,327,400.

SUMMARY OF THE INVENTION

An electric double layer capacitor includes a case, an electrolyte solution accommodated in the case, and an electrode foil immersed in the electrolyte solution. The electrode foil includes a collector and an electrode layer covering the collector. The collector has a first surface and a second surface opposite to the first surface. The collector has apertures provided therein. The apertures communicate with the first surface and the second surface of the collector. The collector includes a projection provided at an edge of at least one aperture out of the apertures. The projection projects from the first surface of the collector and penetrates the electrode layer.

The electric double layer capacitor provides a large contact area and a large joining strength between the collector and the electrode layer, and allows the collector to have a small thickness, hence having a large output density and a large energy density.

BRIEF DESCRIPTION OF THE DRAWINGS

FIG. 5 illustrates evaluation result of characteristics of the electric double layer capacitor according to the embodiment.

FIG. 7 is a cross sectional view of a further collector of the electric double layer capacitor according to the embodiment.

FIG. 8 is a cross sectional view of the collector at line 8-8 shown in FIG. 7.

REFERENCE NUMERALS

21 Case
22 Electrolyte Solution
31 Collector (First Collector, Second Collector)
25 Electrode Layer (First Electrode Layer, Second Electrode Layer)
23 Electrode Foil (First Electrode Foil, Second Electrode Foil)
33 Aperture (First Aperture, Second Aperture)
33A Edge of Aperture
32 Projection (First Projection, Third Projection)

52 Primer Layer
123 Electrode Foil (First Electrode Foil, Second Electrode Foil)
131 Collector (First Collector, Second Collector)
132 Projection (First Projection, Third Projection)
133 Aperture (First Aperture, Second Aperture)
133A Edge of Aperture
232 Projection (Second Projection, Fourth Projection)

DETAIL DESCRIPTION OF THE PREFERRED EMBODIMENT

Figure 1:
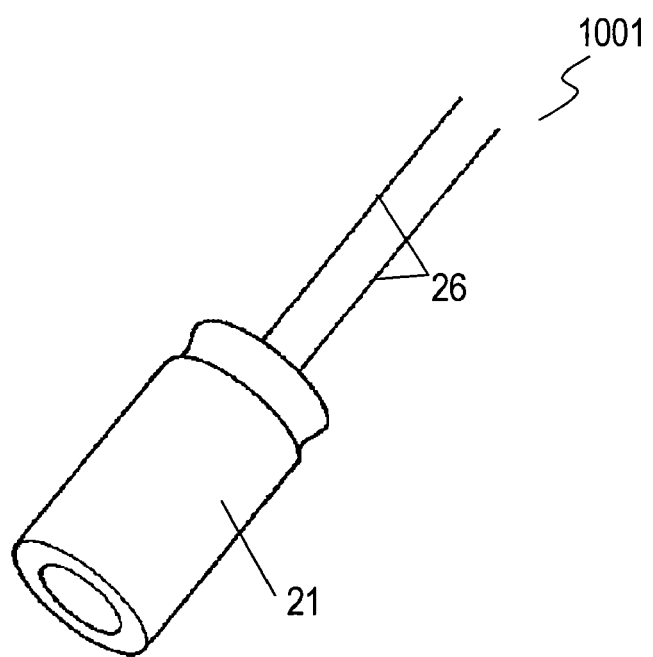
FIG. 1 is a perspective view of an electric double layer capacitor according to an exemplary embodiment of the present invention.
Figure 2:
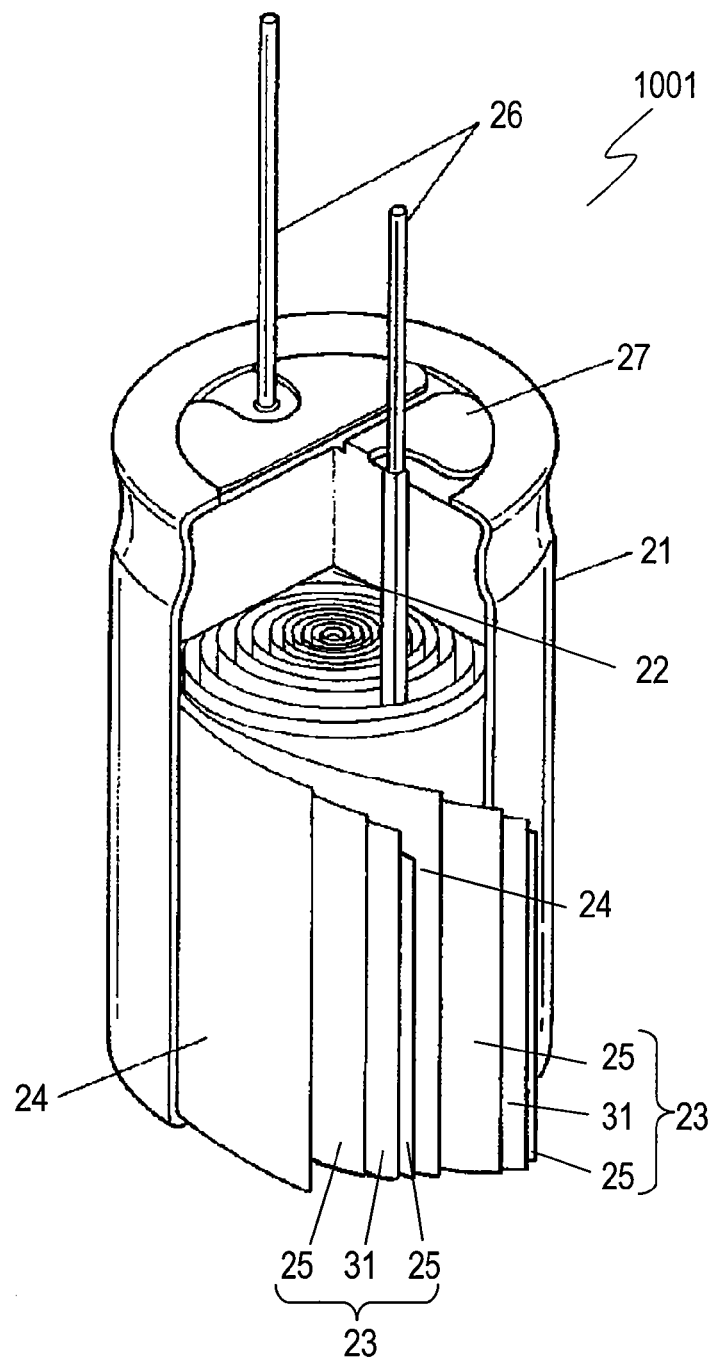
FIG. 2 is a partially cutoff perspective view of the electric double layer capacitor according to the embodiment.

FIG. 1 is a perspective view of an electric double layer capacitor 1001 according to an exemplary embodiment of the present invention. FIG. 2 is a partially cutoff perspective view of the electric double layer capacitor 1001. The electric double layer capacitor 1001 includes a case 21 made of aluminum, a electrolyte solution 22 stored in the case 21, two electrode foils 23 immersed in the electrolyte solution 22, two separators 24 having insulating property, and a sealing rubber 27 sealing the case 21. As shown in FIG. 2, the electrode foils 23 and the separators 24 are wound alternately. More particularly, the two electrode foils 23 are insulated from each with the separator 24 provided between the foils. The two electrode foils 23 are connected to two lead wires 26 made of aluminum, respectively. The lead wires 26 extend through the sealing rubber 27 and are drawn out from the case 21. The electrode foil 23 includes a collector 31 made of aluminum and electrode layers 25 covering both surfaces of the collector 31. The electrode layers 25 contain active carbon. The electrode layer 25 includes mainly conductive carbon, carboxymethyl-cellulose, and poly-tetra-fluoro-ethylene. The electrolyte solution 22 includes electrolyte made of tetra-ethyl-ammonium-tetra-fluoro-borane and a solvent made of polycarbonate.

Figure 3A:
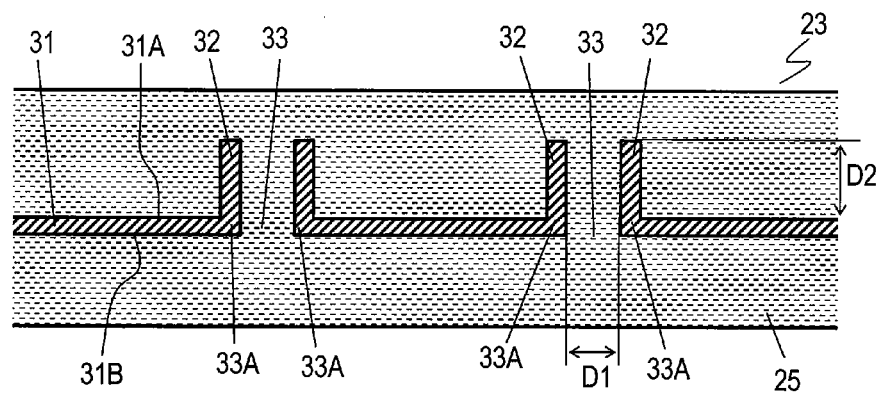
FIG. 3A is a cross sectional view of an electrode foil of the electric double layer capacitor according to the embodiment.

FIG. 3A is a cross sectional view of the electrode foil 23. The collector 31 is made of metallic foil of aluminum, and has a surface 31A and a surface 31B opposite to the surface 31A. The surfaces 31A and 31B of the collector 31 are covered with the electrode layer 25. The collector 31 has plural apertures 33 communicating with the surface 31A and 31B. The collector 31 has projections 32 provided at edges 33A of the apertures 33. The projections 32 extend from the surface 31A. The projections 32 penetrates the electrode layer 25 and produces an anchor effect which increases a joining strength between the collector 31 and the electrode layer 25 even if the apertures 33 are not large. Further, even if the apertures 33 are large, the collector 31 has a large surface area, accordingly reducing an internal resistance of the electric double layer capacitor 1001. The projections 32 reduce the distance between the collector 31 and an active substance contained in the electrode layer 25, accordingly reducing the internal resistance. The electrode foil, upon being wound, as shown in FIG. 2, produces a tension applied to the collector 31. The protrusions 32 increase strength of the collector 31, accordingly providing the collector 31 with a resistance to the tension. The depth by which the projections 32 penetrate the electrode layer 25 is determined by the height D2 of the projections 32. The height D2 of the projections 32 depends on the diameter D1 of the apertures 33. If the diameter D1 of the apertures 33 and the height D2 of the projections 32 are small, the above effects are small accordingly. The diameter D1 of the apertures 33 is preferably not smaller than 20 μm, and the height D2 of the projections 32 is preferably not smaller than 10 μm.

Figure 3B:
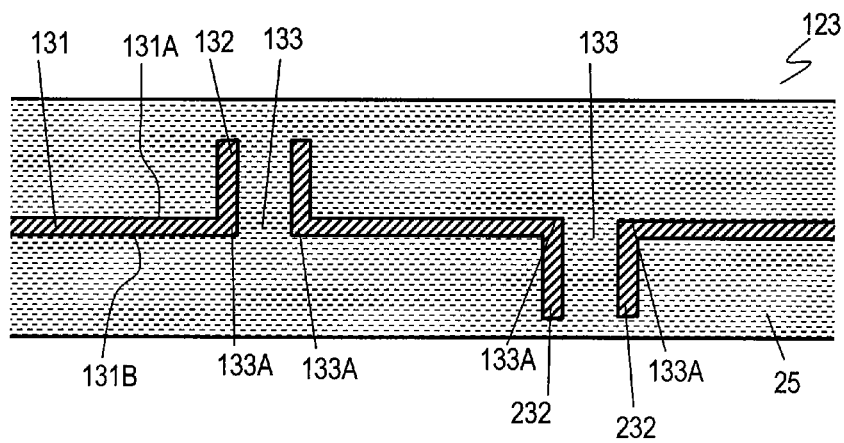
FIG. 3B is a cross sectional view of another electrode foil of the electric double layer capacitor according to the embodiment.

FIG. 3B is a cross sectional view of another electrode foil 123. The electrode foil 123 includes a collector 131 having surfaces 131A and 131B. The surfaces 131A and 131B are covered with the electrode layer 25. The collector 131 has plural apertures 133 therein communicating with the surfaces 131A and 131B. The collector 131 has plural projections 132 and 232 provided at edges 133A of the apertures 133. The projections 132 extend from the surface 131A. The projections 232 extend from the surface 131B. The collector 131 provides the same effects as those of the collector 31 shown in FIG. 3A. The aperture 133 having the projection 132 is located adjacently to the aperture 133 having the projection 232.

Figure 4A:
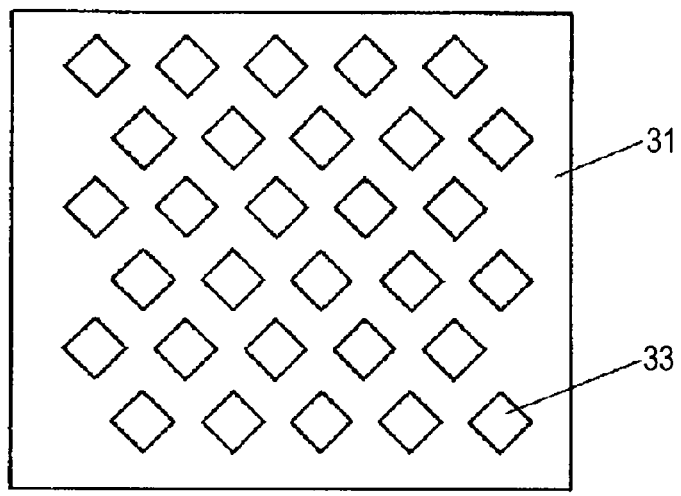
FIG. 4A is a plan view of a collector of the electric double layer capacitor according to the embodiment.

FIG. 4A is a plan view of the collector 31. The apertures 33 provided in the collector 31 have square shapes and arranged in a predetermined pattern. The ratio R(%) of the total Sp of the areas of the apertures 33 to the area SA1 of the collector 31 including the apertures 33 is expressed as follows.

$$R(\%) = Sp/SA1 \times 100$$

The ratio R ranges preferably from 10% to 90%. The rate R less than 10% causes the projections 32 to be too small to produce the anchor effect, accordingly failing to increase the joining strength and to reduce the internal resistance. The rate R greater than 90% unpreferably prevents the collector 31 from withstanding the tension generated by the winding of the electrode foil 23.

Figure 4B:
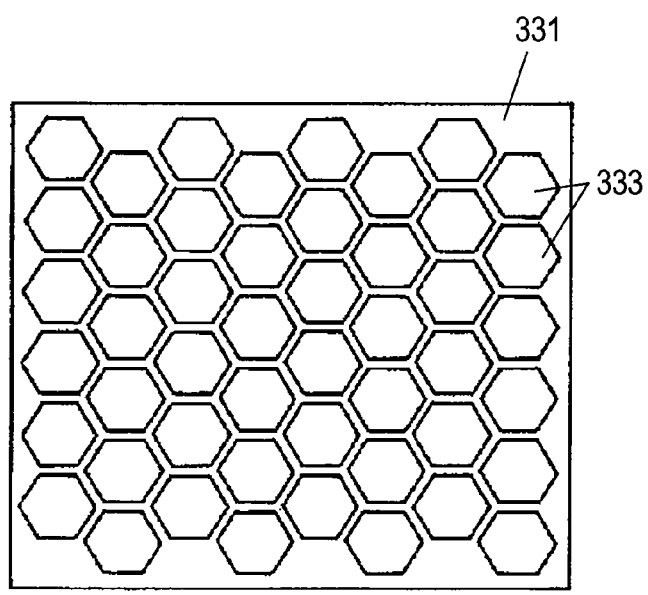
FIG. 4B is a plan view of another collector of the electric double layer capacitor according to the embodiment.

FIG. 4B is a plan view of the collector 331. The collector 331 has apertures 333 having regular hexagon shapes, thus having a honeycomb structure. In the case that a plane is divided into regions having shapes and areas equal to each other, if each shape is a circle, an octagon, or a pentagon, the shapes produce wasted portions between the regions and require walls having various shapes between the regions, hence producing loss of material. If the plane is divided into regions each having a triangle shape, a quadrilateral shape, or a hexagonal shape, these shapes require walls having shapes identical to each other between the regions adjacent to each other, hence not producing the wasted portions. The hexagonal shape has the smallest sum of the sides of the shape among these shapes if the plane is divided into the regions having the same areas. In other words, the collector having the apertures having the hexagonal shapes can be made of least material. An aperture having a quadrilateral shape is weak to a force in its diagonal direction. The aperture having the hexagonal shape does not deform even with a large force in any direction, thus hardly expanding or twisting. The aperture having the regular hexagonal shape allows the collector to have larger strength than the aperture having the quadrilateral shape shown in FIG. 4A, accordingly allowing the collector preferably to have a small thickness.

FIG. 5 illustrates evaluation result of characteristics of the electric double layer capacitor 1001. The evaluated characteristics are the flexibility of the electrode foil 23 as an index of the joining strength and the internal resistance of the electric double layer capacitor 1001. While the electrode foil 23 is wound around a circular column, the flexibility of the electrode foil 23 is expressed by the minimum diameter of the circular column which does not provide the electrode foil 23 with fault, such as a crack. The smaller diameter indicates the larger flexibility of the electrode foil 23, accordingly increasing the joining strength between the collector 31 and the electrode layer 25.

A comparative example of an electrode double layer capacitor includes an electrode foil including a collector having no aperture and no projection.

Example 1 represents an electrode double layer capacitor including the collector 31 shown in FIG. 3A. Example 1 including the collector 31 has larger joining strength between the collector 31 and the electrode layer 25 and larger flexibility of the electrode foil 23 than the comparative example, and has a small internal resistance of 70.8 mΩ.

Example 2 represents an electrode double layer capacitor including the collector 131 shown in FIG. 3B. Example 2 has larger joining strength between the collector 31 and the electrode layer 25 and larger flexibility of the electrode foil 23 than example 1, and has a small internal resistance of 47.2 mΩ.

Example 3 represents an electrode double layer capacitor including the collector 331 having the honeycomb structure shown in FIG. 4B. The collector 331 having therein the apertures having regular hexagon shapes increases the joining strength between the collector and the electrode layer, accordingly allowing the collector to have a small thickness of 15 μm and increasing the flexibility of the electrode foil. Example 3 of the electric double layer capacitor has a small internal resistance of 45.8 mΩ.

The collectors 31, 131, and 331 may be made of metallic material, such as aluminum, titanium, niobium, tantalum, hafnium, zirconium, zinc, tungsten, bismuth, antimony, magnesium, or mixture of them, which produces an inactive film by anodizing.

The thickness of the collectors 31, 131, and 331 may be preferably not smaller than 15 μm and not larger than 100 μm. The thickness of the collectors 31, 131, and 331, being smaller than 15 μm may cause the electrode foil 23 or 123 to be cut due to the tension generated by the winding of the foil. The thickness of the collectors 31, 131, and 331, being larger than 100 μm prevents the electrode foil 23 or 123 from being wound easily.

Figure 6:
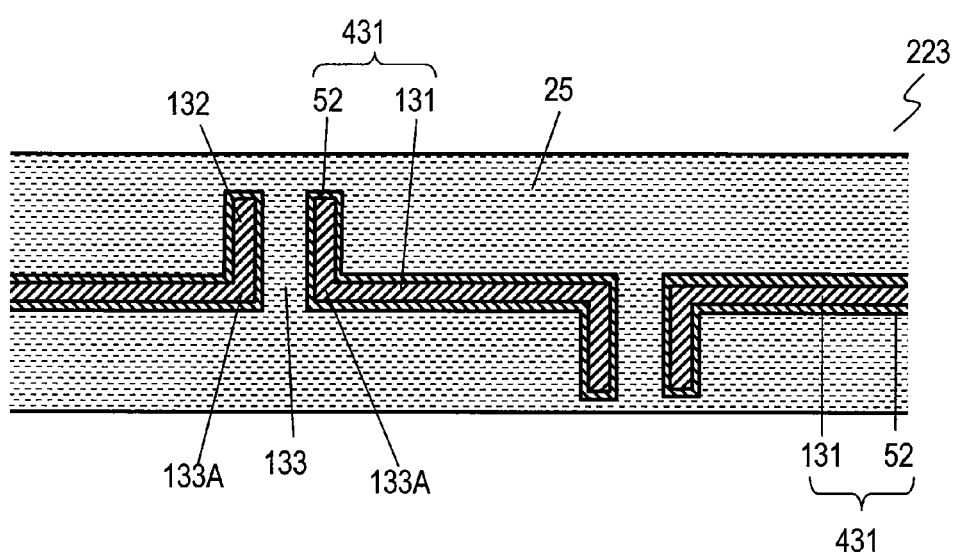
FIG. 6 is a cross sectional view of a further electrode foil of the electric double layer capacitor according to the embodiment.

FIG. 6 is a cross sectional view of a further electrode foil 223 of the electric double layer capacitor 1001. The electrode foil 223 includes a collector 131 shown in FIG. 3B, a primer layer 52 covering the collector 131, and an electrode layer 25 covering the primer layer 52. The primer layer 52 is made mainly of carbon. The collector 131 and the primer layer 52 function together as a collector 431. The primer layer 52 is bonded securely to the electrode layer 25, thereby joining the collector 131 securely to the electrode layer 25.

Example 4 shown in FIG. 5 represents an electric double layer capacitor provided including the primer layer 52. The primer layer 52 increases the joining strength between the collector 131 and the electrode layer 25, and increases the flexibility of the electrode foil 223. The primer layer 52 reduces the internal resistance to 43.3Ω because of a large electrical conductivity of the primer layer 52.

Example 5 shown in FIG. 5 represents an electric double layer capacitor including a collector having therein the apertures of the regular hexagonal shapes shown in FIG. 4B. The apertures having the regular hexagonal shapes further increase the joining strength between the collector and the electrode layer. This structure allows the collector to have a small thickness of 15 μm, accordingly allowing the collector to have a large flexibility and reducing the internal resistance of the capacitor to 41.8 mΩ.

FIG. 7 is a plan view showing a further collector 61 according to the embodiment. FIG. 8 is a cross sectional view of the collector 61 at line 8-8 shown in FIG. 7. The collector 61 is made of aluminum and has apertures 62 provided therein. The collector 61 has an overlap portion 63 provided around each aperture 62. More specifically, the overlap portion 63 is formed by roll-pressing the projection 32 shown in FIG. 3A. The diameter D3 of the apertures 62 is 5 μm. The thickness of the collector 61 is 15 μm.

The aperture 62 has an irregular polygonal shape, such as a star shape. The irregular polygonal shape is a shape which is hardly defined by any of geometrical shapes, such as a quadrilateral, a hexagon, a circle, or an oval shape, and which is defined by a closed loop line including straight and curved lines. The aperture 62 having the irregular polygonal shape is formed by roll-pressing the collectors 31 and 131 shown in FIGS. 3A and 3B. The projections 32 and 132 projecting from the collectors 31 and 131 before the roll-pressing are bent in directions in parallel with the collectors 31 and 131 by the roll-pressing, thus providing the overlap portion 63. The height of the overlap portion 63 is substantially zero, but hardly becomes zero due to variations of processing. The overlap portion 63 having such a small height allows the position of the collector 61 to be controlled easily during the electrode layer 25 being applied onto the collector 61, accordingly allowing the electrode layer to be applied precisely. The collector 61 reduces the internal resistance of the electric double layer capacitor while increasing productivity.

Figure 9:
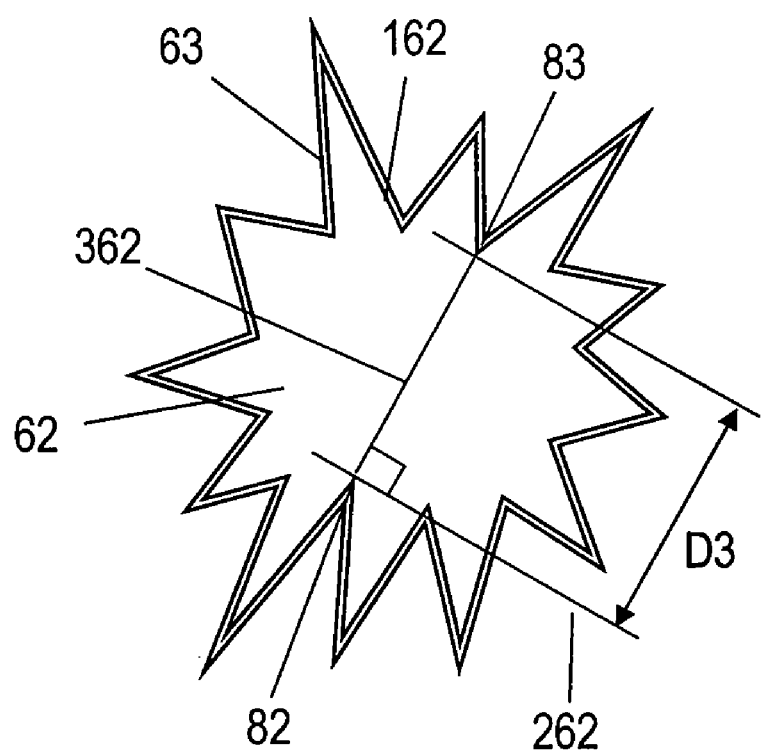
FIG. 9 is an enlarged plan view of the collector shown in FIG. 7.

FIG. 9 is an enlarged plan view of the collector 61 to illustrate the aperture 62. The diameter D3 of the aperture 62 having the irregular polygonal shape is defined as follows. A straight line 362 is drawn across a point 82 on the edge 162 of the aperture 62 and perpendicularly to a tangent 262 line at the point 82. A point 83 different from the point 82 is determined at the position where the straight line 362 crosses the edge 162. The minimum distance between the points 82 and 83 is defined as the diameter D3 of the aperture 62. The diameter D3 may range preferably from 0.01 μm to 50 μm. The diameter D3 according to this embodiment is 5 μm. The diameter D3 of the aperture 62 being smaller than 0.01 μm prevents electrolytic ions from moving through the aperture 62, accordingly increasing the internal resistance. The electrode layer 25 is formed by applying liquid material onto the collector 61. If the liquid material does not have a large viscosity, the diameter D3 being larger than 50 μm may cause the liquid material of the electrode layer 25 to leak from the aperture 62, thus preventing the liquid material from being applied precisely. However, in the case that the electrolytic ions have small diameters, the apertures 62 may not increase the internal resistance even if the diameter D3 of the aperture 62 is smaller than 0.01 μm.

Example 6 shown in FIG. 5 is an electric double layer capacitor including the collector 61 shown in FIGS. 7 to 9. The aperture 62 has the diameter D3 of 5 μm, hence allowing the electrode layer 25 to be made from the liquid material for making the electrode layers of Examples 1 to 5. Example 6 allows the collector 61 to have a small thickness of 15 μm, provides the collector 61 with a large flexibility, and has a small internal resistance of 41.6 mΩ.

The collector 61 of Example 6 is formed by pressing the collector 31 shown in FIG. 3A, thereby forming the overlap portions 63 only on a single surface of the collector 61. In order to form the apertures easily, the collector 61 may be formed by pressing the collector 131 shown in FIG. 3B, thereby forming the overlap portions 63 on both surfaces of the collector 61.

The collectors 31, 61, 131, and 331 are made of aluminum. The electrolyte solution 22 may contain lithium. In this case, the collector may be made from metal, such as copper or nickel, which is hardly alloyed with lithium. This prevents the collector from being alloyed with lithium even when the potential at the electrode foil drops down. In this case, this collector functions as a negative electrode, while the collector functioning as a positive electrode may be made of aluminum. Thus, the collector functioning as the positive electrode and the collector functioning as the negative electrode may be made of materials different from each other.

The electrode layer 25 may contain lithium. In this case, lithium ions in the electrolyte solution can easily diffuse to the electrode foil through the apertures 62 in the collector 61, thereby reducing the time for introducing lithium ions to the electrode foil.

The shape of the apertures in the collector functioning as the positive electrode may be different from the shape of the apertures of the collector functioning as the negative electrode.

The diameter of the apertures in the collector functioning as the positive electrode may be different from the diameter of the apertures of the collector functioning as the negative electrode.

The ratio of the total of the areas of the apertures in the collector functioning as the positive electrode to the area of the collector including the apertures may be different from the ratio of the total of the areas of the apertures of the collector functioning as the negative electrode to the area of the collector including the apertures.

The apertures may be provided only in either the collector functioning as the positive electrode or the collector functioning as the negative electrode.

Thus, the positive electrode and the negative electrode may be different from each other in the shapes of apertures, the diameters of apertures, the areas of apertures, or the existence of the apertures. The ions introduced to or attracted to the collectors functioning as the positive electrode and the negative electrode have different ion diameters including solvates. The positive electrode and the negative electrode may be different from each other in the shapes of apertures, the diameters of apertures, the areas of apertures, or the existence of the apertures as described above, and thereby, allows the ions to move efficiently be quickly, accordingly allowing the ions to be introduced to or attracted to the positive and negative electrodes efficiently.

The height of the projections of the collector functioning as the positive electrode may be different from that of the collector functioning as the negative electrode.

In the electric double layer capacitor 1001, the electrode layers on the positive and negative electrodes may be different from each other in order to optimize the ratio of the capacitances of the positive and negative electrodes. In this case, the projections of one of the positive and negative electrodes may extend out from the surface of the electrode layer, thereby short-circuiting between the positive and negative electrodes. If the projections of the collector do not extend close to the surface of the electrode layer, the projections cannot reduce the internal resistance. The height of the projections of the collector functioning as the positive electrode is determined, based on the thickness of the electrode layers, to be different from the height of the projections of the collector functioning as the negative electrode. This structure prevents the collectors from the short-circuiting and prevents the internal resistance from increasing.

The electric double layer capacitor 1001 according to this embodiment has a small internal resistance and prevents the internal resistance from increasing with time. Further, the electric double layer capacitor 1001 has a high output density and a high energy density, accordingly having a large capacitance.

According to the embodiment, the electric double layer capacitor is described. The collector including the projections according to the embodiment provides, with the same effects, electricity-storage devices, such as electrochemical capacitors, organic electrolyte batteries, asymmetrical capacitors, organic electrolyte capacitors, or super capacitors, which can charge and discharge electric energy by physical or electrochemical attaching and removing of ions.

INDUSTRIAL APPLICABILITY

An electric double layer capacitor according to the present invention has a small internal resistance and a large capacitance, and is useful for power supplies of various electronic apparatuses.

The invention claimed is:

1. An electric double layer capacitor comprising:
   a case;
   an electrolyte solution accommodated in the case, the electrolyte solution containing lithium ions;
   a first electrode foil immersed in the electrolyte solution, the first electrode foil including a first collector and a first electrode layer provided on the first collector, the first collector being made of copper or nickel and functioning as a negative electrode; and
   a second electrode foil immersed in the electrolyte solution, the second electrode foil including a second collector and a second electrode layer provided on the second collector, the second collector being made of aluminum and functioning as a positive electrode, wherein:
   each of the first collector and the second collector has a first surface and a second surface opposite to the first surface,
   the first electrode layer and the second electrode layer are made from liquid material applied onto the first collector and the second collector, respectively,
   each of the first collector and the second collector has a plurality of apertures provided therein, the plurality of apertures communicating with the first surface and the second surface,
   at least one of the first collector and the second collector has overlapping portions at edges of the plurality of apertures, and
   at the overlapping portions, a part of said at least one of the first collector and the second collector is bent to overlap and contact said at least one of the first collector and the second collector.

2. The electric double layer capacitor according to claim 1, wherein the plurality of apertures have different sizes.

3. The electric double layer capacitor according to claim 1, wherein:
   a size of each of the plurality of apertures ranges from 0.01 μm to 50 μm, and
   the size of each of the plurality of apertures is defined in that:
      a straight line is drawn across a first point on an edge of each of the plurality of apertures and perpendicularly to a tangent line at the first point;
      a second point that is different from the first point is determined at a position where the straight line crosses the edge; and
      the size of the plurality of apertures is defined as a minimum distance between the first point and the second point.

4. The electric double layer capacitor according to claim 3, wherein the plurality of apertures have different sizes.

5. The electric double layer capacitor according to claim 1, wherein the plurality of apertures have irregular polygonal shapes having different shapes so as to allow lithium ions to move therethrough and to prevent the liquid material from leaking therefrom during applying the liquid material.

6. An electric double layer capacitor comprising:
a case;
an electrolyte solution accommodated in the case, the electrolyte solution containing lithium ions;
a first electrode foil immersed in the electrolyte solution, the first electrode foil including a first collector and a first electrode layer provided on the first collector, the first collector being made of copper or nickel and functioning as a negative electrode; and
a second electrode foil immersed in the electrolyte solution, the second electrode foil including a second collector and a second electrode layer provided on the second collector, the second collector being made of aluminum and functioning as a positive electrode, wherein:
each of the first collector and the second collector has a first surface and a second surface opposite to the first surface,
the first electrode layer and the second electrode layer are made from liquid material applied onto the first collector and the second collector, respectively,
the first collector has a plurality of first apertures provided therein, the plurality of first apertures communicating with the first surface and the second surface of the first collector,
the second collector has a plurality of second apertures provided therein, the plurality of second apertures communicating with the first surface and the second surface of the second collector,
the plurality of first and second apertures have irregular polygonal shapes so as to allow lithium ions to move therethrough and to prevent the liquid material from leaking therefrom during applying the liquid material,
a ratio of a total of areas of the plurality of first apertures to an area of the first collector including the plurality of first apertures is different from a ratio of a total of areas of the plurality of second apertures to an area of the second collector including the plurality of second apertures,
the first collector has first overlapping portions at edges of the plurality of apertures, and
at the first overlapping portions, a part of the first collector is bent to overlap and contact the first collector.

7. The electric double layer capacitor according to claim 6, wherein
the second collector has overlap portions at edges of the plurality of second apertures, and
at the overlapping portions, a part of the second collector is bent to overlap the second collector.

8. The electric double layer capacitor according to claim 6, wherein:
a size of each of the plurality of apertures ranges from 0.01 μm to 50 μm, and
the size of each of the plurality of apertures is defined in that:
a straight line is drawn across a first point on an edge of each of the plurality of apertures and perpendicularly to a tangent line at the point;
a second point that is different from the first point is determined at a position where the straight line crosses the edge; and
the size of each of the plurality of first apertures is defined as a minimum distance between the first point and the second point.

\* \* \* \* \*